Dec. 13, 1927.
H. A. HOUSTON
1,652,530
RADIAL TRUCK SUPPORT
Filed Oct. 19, 1922
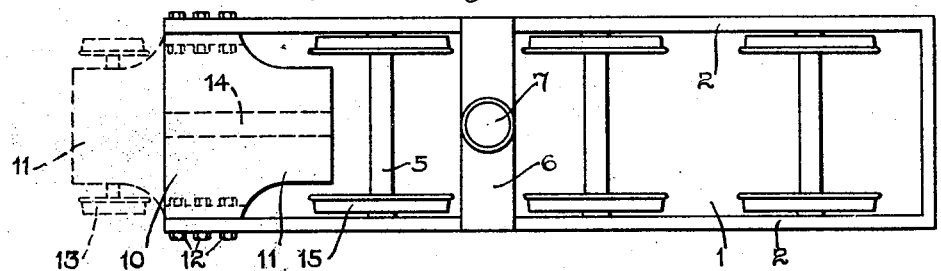
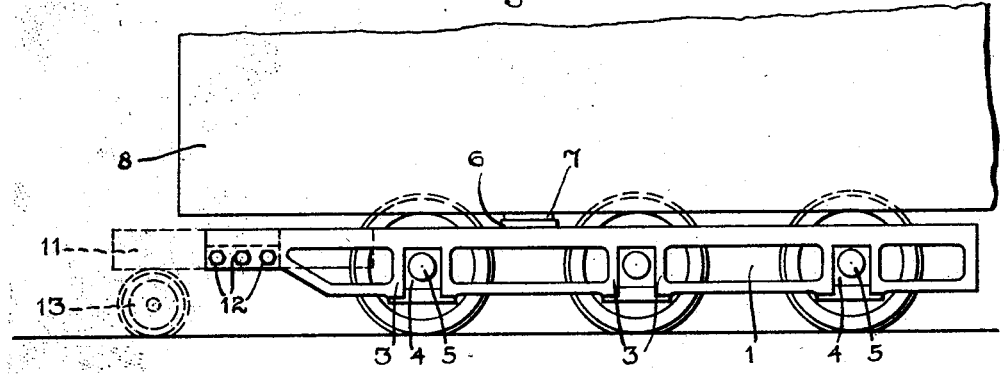
WITNESSES:
INVENTOR
Harold A. Houston.
BY
ATTORNEY Patented Dec. 13, 1927.

1,652,530

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

RADIAL TRUCK SUPPORT.

Application filed October 19, 1922. Serial No. 595,491.

My invention relates to railway-vehicle bodies and more especially to the wheeled truck members upon which such bodies are mounted.

It is among the objects of this invention to provide a truck-frame construction which shall be adapted to various types of service, in which it may be employed, either with or without a guiding truck frame.

It is a further object of this invention to provide a truck frame which shall be of simple and durable construction and which shall be adapted to be altered for a particular service requirement, in which it is to operate, in a simple and expeditious manner.

It frequently occurs that a locomotive originally built without guiding trucks will require them when the character of the service is changed. The locomotive may have been originally designed for yard service and then be installed for road service or it may be transferred from a road that is practically a tangent to one having a large number of curves.

The original main frames cannot generally be built for such transformation on account of the long overhang necessary between the pilot beam and the first pair of drivers. In order to add a guiding truck to such a standard locomotive, it is necessary to alter the entire frame work of the trucks or replace them with truck members provided with suitable projections to which a guiding truck may be secured.

My present invention is directed to a locomotive-truck construction provided with a pilot beam having a projection which may be reversed in position so that a guiding truck may be added. Such a pilot beam could be embodied in the original construction of the truck, the projecting member being disposed inwardly between the side frames.

In the accompanying drawing constituting a part hereof and in which like reference characters designate like parts, Figure 1 is a plan view of a locomotive truck embodying the principles of this invention.

Fig. 2 is a side elevational view thereof.

Referring to Fig. 1, the truck 1 constitutes one of a pair of articulating truck members commonly employed on locomotives which comprises a pair of side frames 2 having the usual side pedestals 3 for movably supporting journal boxes 4 in which the wheeled axles 5 are journaled. The side frames are provided with a transfer center bearing plate 6 having a center bearing 7 adapted to pivotally mount a locomotive cab or body 8 to provide a swivel connection between the truck member and the cab. The front end of the truck is provided with a pilot beam 10 having a projecting ledge or sill 11 extending inwardly in the direction of the drivers. The pilot beam 10 is secured between the side frames 2 by a plurality of bolts 12.

When it is desired to add a guiding truck comprising a pair of idle guide wheels 13, the pilot beam 10 is removed and reversed so that the projecting sill 11 will protrude beyond the side frames of the truck, as indicated by the dotted lines. The pilot beam 10 is provided with a longitudinal recess 14 in which the guide truck is mounted, a suitable distance from the front drive wheels 15. The reversed pilot beam is secured to the truck frames by the bolts 12 in the same manner as before.

It will be readily understood, from the above description of my invention, that locomotive truck frames constructed in accordance with the principles herein set forth provide suitable means for adapting such trucks, to the addition of guiding trucks as the service requirements may necessitate. It is obvious that my construction provides a convenient means for adapting guiding idle trucks to standard locomotives originally designed without them and that the changes in the frame structure are few and simple to make.

Although I have described a specific embodiment of my invention, it will be obvious to those skilled in the art that various modifications may be made in the details of construction without departing from the principles herein set forth. For instance, the general construction of pilot-beam side frames and idle trucks may be such as to facilitate their adaptation to the service requirements, and the extensible pilot beam may be of any suitable shape to adapt it for the use of guiding truck service.

I claim as my invention:

1. In a railway-vehicle body support, the combination with a truck frame of a pilot beam having an extension provided thereon, said pilot beam being adapted to be secured to the truck frame with its extension projecting in a plurality of positions relative to said truck frame.

2. In a railway-vehicle body support, the combination with a truck frame of a pilot beam having an extension provided thereon, said pilot beam being adapted to be secured to the truck frame with its extension projecting in a plurality of alternate positions relative to said truck frame.

3. In a railway-vehicle body support, the combination with a truck frame of a pilot beam having an extension provided thereon, said pilot beam being adapted to be secured to the truck frame with its extension projecting inwardly or outwardly thereof.

In testimony whereof, I have hereunto subscribed my name this 13th day of October 1922.

HAROLD A. HOUSTON.